July 15, 1952     F. RUBIN ET AL     2,603,002

SELF-CENTERING INSIDE AND OUTSIDE CALIPER

Filed April 29, 1949

Inventors
Frank Rubin
Barron B. Henderson

By Clarence A. O'Brien
and Harvey B. Jacobson
Attorneys

Patented July 15, 1952

2,603,002

UNITED STATES PATENT OFFICE 2,603,002

SELF-CENTERING INSIDE AND OUTSIDE CALIPER

Frank Rubin and Barron B. Henderson, Okanogan, Wash.

Application April 29, 1949, Serial No. 90,408

2 Claims. (Cl. 33—191)

This invention relates to novel and useful improvements in measuring instruments.

An object of this invention is to measure inside and outside dimensions of an article by means of a pair of jaws which are carried by a calibrated support, one of which is stationarily disposed on the support and the other which is movable with respect to the stationary jaw, and to indicate the center of the distances, and to act as a scriber for laying out workcenters between the outside feeler surfaces of the jaws and the inside feeler surfaces of the jaws, by means of a centering scriber always located at equi-distance between the stationary jaw and movable jaw, at any degree of opening.

Another object of the invention is to read dimension distances directly from the calibrated support through a vision opening provided in one of the jaws, whereby the same vision opening is used for both measurements, the opening having markers thereadjacent indicative of the distance between the outside surfaces of the outside work engaging surfaces and inside work engaging surfaces.

Another object of this invention is to provide an inexpensive but accurate device of the nature to be described which is easily operative that is, by rotation of a single screw.

Ancillary objects and features of novelty will become apparent to those skilled in this art, in following the description of the preferred forms of the invention, illustrated in the accompanying drawings, wherein.

Figure 1:
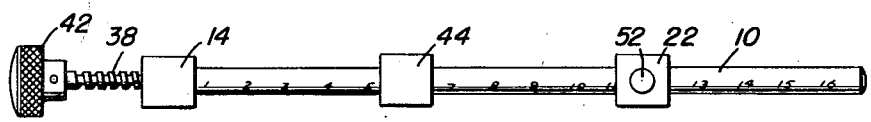
Figure 1 is a plan view of the first form of the invention.

The present invention is adaptable for use in measuring inside and outside dimensions of any suitable article such as cylinders, tubing, a casing or others. The adaptability and use of the preferred forms of the invention is readily apparent to all those skilled in the art and to individuals having utility for such an instrument.

A support 10 is provided with calibrations thereon and is preferably a longitudinal rod. At one end of the support is a reduced shank 12 for accommodation of a jaw 14. This jaw has a recess or cut-out portion 16 on the inner surface thereof and a bore 18 accommodating the reduced shank. A pin 20 is passed through the reduced shank and a part of the jaw 14 for fixing the jaw 14 thereto. This jaw will be hereinafter referred to as the stationary jaw since it is fixed with respect to the support 10.

A second jaw 22 is disposed for longitudinal movement on the support 10, the support being passed through a suitable passage 24 supplied adjacent the upper end thereof. There is a recess 26 provided in the inner surface of the jaw 22 which is preferably identical in shape to the said recess 16. Accordingly, there is a stationary jaw and a movable jaw, each carried by the support 10 having the calibrations thereon.

A vision opening 28 is provided in the movable jaw 22 and has a pair of markings 30 and 32 respectively thereon. The vision opening allows reading of the calibrations therethrough.

The feet of the jaws have work engaging surfaces thereon. The stationary jaw 14 has an inner work engaging surface 34 for outside measurements and an outer work engaging surface 36 for inside measurements. The outer work engaging surface 36 may be semi-cylindrical in shape or flat as the inner work engaging surface 34 is disclosed. Each jaw has identical work engaging surfaces.

Means for moving the movable jaw with respect to the stationary jaw is supplied. The preferable means consists of a screw 38 which has a smooth center section 40 therein and left hand and right hand threads emanating therefrom. Passages are supplied in each jaw accommodating the threads, the left hand threads being disposed in one of the jaws and the right hand threads being disposed in the other of the jaws. Accordingly, upon rotation of the screw as by the knob 42, the movable jaw 22 is actuated toward the stationary jaw 14 and the screw 38 is moved an equal amount through the stationary jaw.

Means is carried on the center section 40 of the screw and on the calibrated support 10 for indicating one-half the distance between the two inside surfaces of the jaws and one-half the distance between the two outside surfaces of the jaws. This center indicator is preferably in the form of a block 44 which is slidably disposed on the support 10 as by means of a suitable passage (unnumbered) in the block. A second passage 46 is also in the block and has the smooth portion 40 disposed therein. Through the medium of a pin 48 which extends transversely across the second passage 46 and which is disposed in a groove or reduced portion of the smooth center section of the screw, the center indicator 44 is movable longitudinally of the support 10 as the screw 38 moves. The lower end portion of the center indicator may be pointed as seen at 50 in order that the exact center be located.

After the work engaging surfaces are disposed either on the inside or outside of an article to be measured, the set screw 52 which is carried by the movable jaw 22 may be operated in order that it clampingly engages the support 10. Hence, the jaws are held firmly in place with respect to each other in order that the instrument may be removed to take the reading remote from the work.

Figure 3:
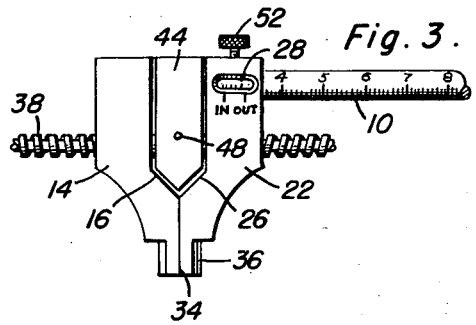
Figure 3 is a fragmentary elevational view of a part of the device, showing the jaws in the closed position and showing the center indicator in nested relationship with recesses provided in the jaws.
Figure 4:
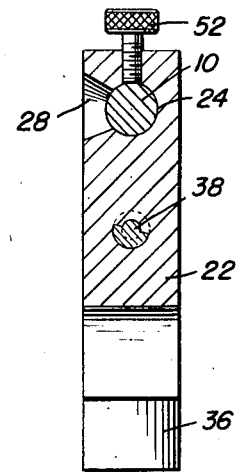
Figure 4 is a transverse sectional view taken on the line 4—4 of Figure 2 and in the direction of the arrows.

When the jaws are in the full closed position as shown in Figure 3, the center indicator 44 is disposed between the two jaws and in nested relationship therewith, being located in the recesses 16 and 26. This allows both jaws to come to the full closed position.

Figure 2:
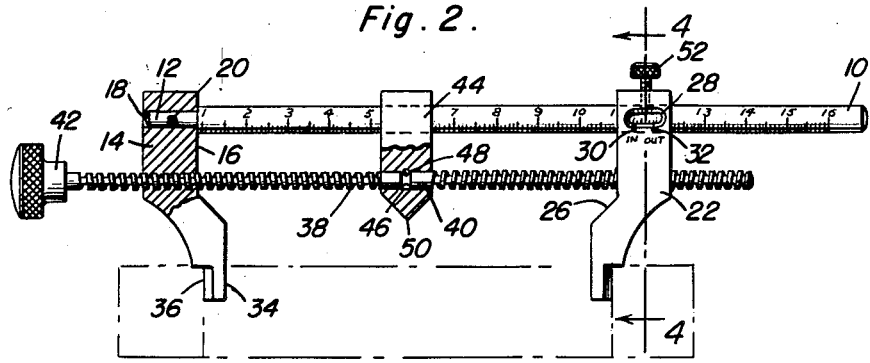
Figure 2 is an elevational side view of the device shown in Figure 1, showing an application thereof and portions thereof being broken away in section to illustrate detail of construction.
Figures 5, 6, 7:
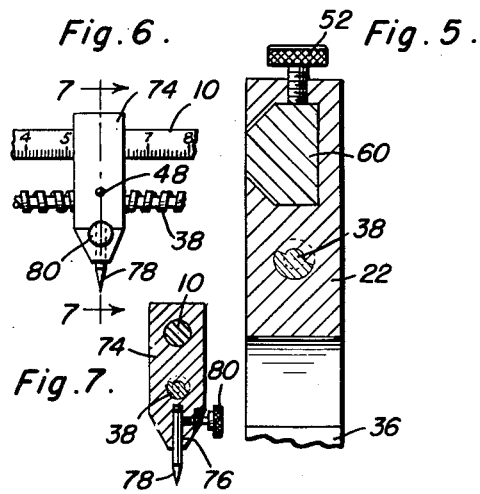
Figure 5 is a transverse sectional view showing an alternative shape in cross section of the support.
Figure 6 is a fragmentary elevational view showing a modified form of the invention and illustrating particularly a scriber carried by the center indicator; and, Figure 7 is a sectional view taken on the line 7—7 of Figure 6 and in the direction of the arrows.

Referring to Figure 5 it will be seen that all of the operative elements of the device are identical to those shown in Figure 2. The only differentiating feature being the non-circular shape of the support 60 which is equivalent to the support 10. Of course, the openings in the center indicator 44 and in the jaw 22 must be of a complemental shape with respect to the cross sectional configuration of the said support 60. By utility of a support as seen at 60 readings are facilitated.

In some instances and forming a slight departure from the described operation and structure of the invention, it is desired to make a center mark as by scribing or pressing firmly. In this instance a slightly modified form of block 74 which is similar to the center block 44 is provided. The differentiating feature is the provision of an opening 76 disposed at the bottom part of the center block accommodating a scriber 78, knife blade, cutter or the like. A set screw 80 is carried by the center block 74 and is in operative engagement with the illustrated scriber 78 in order to maintain it in adjusted positions.

Accordingly, since the center block 74 as well as the center block 44 always measures the exact center of the distance between the feet, a scriber 78 carried thereby will make such an equi-distance mark on the workpiece.

The practical operation is believed manifest in that not only is the distance measured between two points but the center is obtained and marked by a single operation.

It is apparent that variations may be made without departing from the spirit of the invention.

Having described the invention, what is claimed as new is as follows:

1. A device for measuring inside and outside dimensions comprising a calibrated support, a stationary jaw carried by said support at one end thereof, a movable jaw carried by said support and having an opening therein for vision of the calibrations on said support, the adjacent ends of each jaw having a pair of spaced work engaging surfaces, a first surface of each pair adapted for inside use, and a second surface of each pair adapted for outside use, indicator lines on said movable jaw adjacent said vision opening for readings corresponding to the distances between the two first surfaces and between the two second surfaces, said jaws having recesses in the inner sides thereof, a center indicator slidably disposed on said support and fitted in said recesses when said jaws are together, a screw threadedly disposed in said jaws for operating said jaws and rotatively disposed in said center indicator, means carried by said center indicator for preventing movement of said center indicator axially of said screw, said means including a pin carried by the center indicator, said screw being provided with a peripheral groove, and said pin being located in said groove.

2. The combination of claim 1 and said center indicator having an opening at the bottom thereof, a scriber disposed in said opening, and adjustable means carried by said center indicator engaging said scriber to maintain said scriber in said opening.

FRANK RUBIN.
BARRON B. HENDERSON.

REFERENCES CITED

The following references are of record in the file of this patent:

UNITED STATES PATENTS

| Number | Name | Date |
|---|---|---|
| 1,280,379 | Bonney | Oct. 1, 1918 |
| 1,355,724 | Zhukoff | Oct. 12, 1920 |
| 1,516,631 | D'Erville | Nov. 25, 1924 |
| 2,170,582 | Wolter | Aug. 22, 1939 |

FOREIGN PATENTS

| Number | Country | Date |
|---|---|---|
| 410,839 | France | Mar. 23, 1910 |
| 635,704 | Germany | Sept. 22, 1936 |